United States Patent Office 3,179,713
Patented Apr. 20, 1965

3,179,713
ORGANOPOLYSILOXANE ISOCYANATE COMPOSITION FOR IMPARTING SCUFF RESISTANCE AND WATER REPELLENCY TO LEATHER
Murrel A. Brown, Midland, Mich., assignor to Dow Corning Corporation, Midland, Mich., a corporation of Michigan
No Drawing. Filed Mar. 26, 1962, Ser. No. 182,660
7 Claims. (Cl. 260—825)

This invention relates to a new composition of matter useful for treating leather to render it both water repellent and scuff resistant.

It is well recognized that leather has notoriously poor water repellency. In fact, a drop of water placed on untreated leather soaks in immediately. In recent years a number of effective methods have appeared for rendering leather water repellent based on polysiloxane compositions. Among these can be mentioned the methods disclosed in U.S. Patents 2,678,893, 2,728,736 and Re. 23,879, wherein organopolysiloxane compositions are applied to leather and cured thereon.

While the prior compositions have in many cases rendered leather satisfactorily water repellent, the resistance to scuffing of the treated leather has been practically non-existent.

Recently there has been available a method of rendering leather scuff-resistant by employing urethane-type organic polymers such as the polyester- or polyether-urethanes. While the scuff resistance of the leather is improved thereby, water repellency is not imparted by the said treatment.

The composition of the present invention will, when applied to leather and cured thereon, drastically improve not only the water repellency of the treated leather, but the scuff resistance as well. In addition, the so treated leather has improved finishability over leather treated by former methods.

By leather is meant any tanned or tawed animal hide, such as steer, calf, pig, kid, etc. Any of the above leathers can be treated by the instant composition to improve the water repellency and scuff resistance of the treated leather. Of particular value is the treatment of leather for shoes, but any finished leather article that would benefit by being more water repellent and scuff resistant is contemplated. The treatment described herein is applied prior to finishing of the leather.

One object of this invention is to provide a composition that can be applied to leather to improve its water repellency and scuff resistance.

Another object is to provide a method of treating leather that imparts improved water repellency and scuff resistance to the leather.

A further object is to produce treated leather having drastically improved water repellency and scuff resistance.

Still another object of this invention is to impart a water repellency scuff resistant treatment on leather that provides easier finishability to the so treated leather.

These and further objects will be apparent from the following description.

This invention relates to a composition comprising
(1) From 10 to 75 percent by weight of an organopolysiloxane isocyanate of the structure

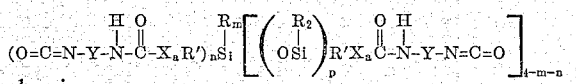

wherein
R is selected from the group consisting of monovalent aliphatic and cycloaliphatic hydrocarbon radicals, and monovalent aliphatic and cycloaliphatic halohydrocarbon radicals, R' is a divalent aliphatic radical being selected from the group consisting of hydrocarbons, hydrocarbon monoethers, hydrocarbon monothioethers, hydrocarbon monoesters and hydrocarbon monotertiarylamines,
X is selected from the group consisting of —O—, —S—,

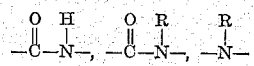

wherein R is as above defined,
Y is a divalent hydrocarbon radical free of aliphatic unsaturation having at least four carbon atoms therein,
$a$ is an integer from 0 to 1 inclusive,
$m$ is an integer from 0 to 2 inclusive,
$n$ is an integer from 0 to 1 inclusive,
$m+n$ is an integer from 0 to 3 inclusive,
$p$ is a positive integer such that the sum of all $p$ values in the molecule is from 30 to 700 inclusive, and (2) From 25 to 90 percent by weight of a triorganosilyl endblocked diorganopolysiloxane having a viscosity of from 50 to 10,000 cs. at 25° C. wherein the organic radicals attached to silicon are selected from the group consisting of monovalent aliphatic hydrocarbon radicals, monovalent aliphatic halohydrocarbon radicals and monovalent cyanoalkyl radicals.

Radical R can be any monovalent radical as defined above. Examples of R that can be used in the organopolysiloxane isocyanate include, for example, alkyl radicals such as methyl, ethyl, isopropyl, tertiarybutyl and octadecyl; alkenyl radicals such as vinyl, allyl, methallyl and butadienyl; alkynyl radicals such as ethynyl; cycloalkyl radicals such as cyclopentyl and cyclohexyl; and cycloalkenyl radicals such as cyclopentenyl.

Radical R can also be halogenated derivatives of the above said radicals, such as chloromethyl, 3,3,3-trifluoropropyl, 2-bromovinyl, 3,4-diiodocyclohexenyl and α-chloro-α,β,β-trifluorocyclobutyl.

Any divalent radical R' as stated above will operate in the instant invention. Radical R' can be hydrocarbon, such as alkylene, such as —CH$_2$—, —CH$_2$CH(CH$_3$)—, —CH$_2$CH(CH$_3$)CH$_2$—, —(CH$_2$)$_{18}$— and

—CH$_2$C(CH$_3$)$_2$— alkenylene such as

—CH=CHCH$_2$—

—CH$_2$CH=C(CH$_3$)CH$_2$— and

CH=CHCH=CH— alkylene such as

—CH$_2$C≡CCH$_2$— cycloaliphatic such as

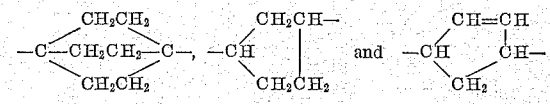

hydrocarbon ether such as —CH$_2$CH$_2$OCH$_2$CH$_2$— and —CH$_2$CH$_2$CH$_2$OCH$_2$CH(CH$_3$)—; hydrocarbon thioether such as —CH$_2$CH$_2$SCH$_2$—; hydrocarbon ester such as

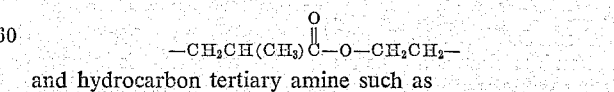

and hydrocarbon tertiary amine such as

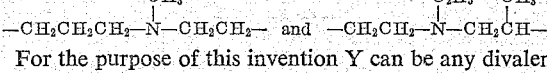

For the purpose of this invention Y can be any divalent hydrocarbon radical free of aliphatic unsaturation containing at least four carbon atoms. Examples of such are alkylene radicals such as butylene, octylene, octadecylene and

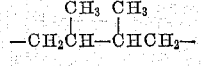

cycloaliphatic radicals such as

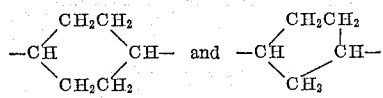

and aromatic divalent radicals such as —C$_6$H$_4$C$_6$H$_4$—, —C$_6$H$_4$—, —C$_6$H$_4$CH$_2$C$_6$H$_4$—, —C$_6$H$_3$(CH$_3$)—,

—CH$_2$C$_6$H$_4$CH$_2$— and naphthylene.

The organopolysiloxane isocyanate can be any one of the structures listed below. It is to be understood that the structures given are idealized, representing, as in the case of all known polymeric materials, the average structure of the material, and are not intended to even infer that only one specie can be present in a given compound. In the structures below the symbol A represents the groups

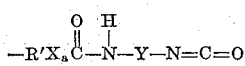

for simplicity of presentation:

| | Value of $m$ | Value of $n$ |
|---|---|---|
| 1. R$_2$Si$\overset{A}{\underset{}{}}$(OSi$\overset{R_2}{\underset{}{}}$)$_p$A | 2 | 1 |
| 2. R$_2$Si[(OSi$\overset{R_2}{\underset{}{}}$)$_p$A]$_2$ | 2 | 0 |
| 3. RSi$\overset{A}{\underset{}{}}$[(OSi$\overset{R_2}{\underset{}{}}$)$_p$A]$_2$ | 1 | 1 |
| 4. RSi[(OSi$\overset{R_2}{\underset{}{}}$)$_p$A]$_3$ | 1 | 0 |
| 5. ASi[(OSi$\overset{R_2}{\underset{}{}}$)$_p$A]$_3$ | 0 | 1 |
| 6. Si[(OSi$\overset{R_2}{\underset{}{}}$)$_p$A]$_4$ | 0 | 0 |

It can be seen that structures 1 and 2 are organopolysiloxane diisocyanates, that structures 3 and 4 are organopolysiloxane triisocyanates and that structures 5 and 6 are organopolysiloxane tetraisocyanates. Despite the differences in functionality of the various types of these compounds, it has been found that the siloxane content (sum of $p$ values per molecule average) must be from 30 to 700 inclusive average per molecule. If the average siloxane content is below 30, the cured composition on leather is too brittle and will crack on flexing. If the average total of $p$ is greater than about 700, the cured treated leather does not have the desirable scuff resistance imparted by the materials of this invention. A preferred range is 60 to 200, but this is not intended to limit the invention, as any siloxane isocyanate as depicted above having an average total of $p$ value from 30 to 700 inclusive is operable in this invention.

Methods of preparing polysiloxane isocyanate (1) are shown in detail in an application entitled "Polysiloxane Isocyanates" by Loren A. Haluska, Serial No. 182,663, filed March 26, 1962, and is made a part of this application by reference. One method of preparation is by reacting an organofunctional carbon compound containing aliphatic unsaturation with an organopolysiloxane containing an average of two or more silicon-bonded hydrogen atoms per molecule such that there is at least one said organofunctional carbon compound for each silicon-bonded hydrogen atom. The reaction involves addition of the silicon and hydrogen across the multiple bond of the unsaturated carbon compound, as

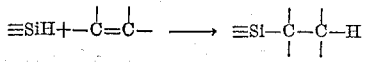

or

This is a well-known reaction in silicone chemistry. Heat and pressure, or catalysts such as platinum or organic peroxides facilitate the said reaction. The resulting compound is a modified polysiloxane fluid containing an average per molecule of two or more (one each wherever there was silicon-bonded hydrogen) organofunctional radicals attached to silicon through a carbon atom of the said radical.

The functional group of the organic radical is then reacted with an organic diisocyanate such that one of the isocyanate radicals of the said diisocyanate reacts thereby, leaving the other isocyanate radical unaffected and capable of further reaction when desired. Thus, the functional group of the chosen organic compound (which originally contained aliphatic unsaturation and after reaction with silicon-bonded hydrogen became a radical attached to a polysiloxane, as above) must contain an active hydrogen, and is selected from hydroxyl, mercapto, amido, substituted amino and carboxyl. Each of these contain one active hydrogen per radical, and react with an isocyanate radical as follows:

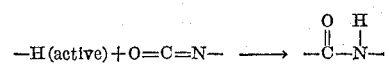

The above named functional groups react with an isocyanate as given in the following table:

| Functional Group | Reaction | Product |
|---|---|---|
| Hydroxyl | —OH+O=C=N— | —O—$\overset{O}{\underset{}{\overset{\|}{C}}}$—$\overset{H}{\underset{}{\overset{\|}{N}}}$— |
| Mercapto | —SH+O=C=N— | —S—$\overset{O}{\underset{}{\overset{\|}{C}}}$—$\overset{H}{\underset{}{\overset{\|}{N}}}$— |
| Amido | —$\overset{O}{\underset{}{\overset{\|}{C}}}$—$\overset{R}{\underset{}{\overset{\|}{N}}}$—H+O=C=N— (R=hydrogen or aliphatic radical) | —$\overset{O}{\underset{}{\overset{\|}{C}}}$—$\overset{R}{\underset{}{\overset{\|}{N}}}$—$\overset{O}{\underset{}{\overset{\|}{C}}}$—$\overset{H}{\underset{}{\overset{\|}{N}}}$— |
| Substituted amino | —$\overset{R}{\underset{}{\overset{\|}{N}}}$H+O=C=N— (R=aliphatic radical) | —$\overset{R}{\underset{}{\overset{\|}{N}}}$—$\overset{O}{\underset{}{\overset{\|}{C}}}$—$\overset{H}{\underset{}{\overset{\|}{N}}}$— |
| Carboxyl | —$\overset{O}{\underset{}{\overset{\|}{C}}}$—O—H+O=C=N— | [—$\overset{O}{\underset{}{\overset{\|}{C}}}$—O—$\overset{O}{\underset{}{\overset{\|}{C}}}$—$\overset{H}{\underset{}{\overset{\|}{N}}}$—]—CO$_2$ to —$\overset{O}{\underset{}{\overset{\|}{C}}}$—$\overset{H}{\underset{}{\overset{\|}{N}}}$— |

The reactions are better understood by reference to Example 1 which illustrates the described method with specific compounds.

When radical R' is methylene, these polysiloxane isocyanates are derived from modified polysiloxanes containing hydroxymethyl radicals therein. The reaction is as follows:

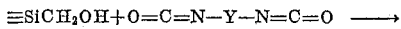

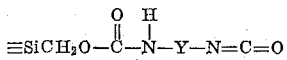

wherein Y is as defined for the invention.

Examples of monovalent aliphatic radicals operable in diorganopolysiloxane (2) include, for example, alkyl radicals such as methyl, ethyl, isopropyl, tertiary butyl and octadecyl; alkenyl radicals such as vinyl, allyl, methallyl and butadienyl; alkynyl radicals such as ethynyl; cycloalkyl radicals such as cyclobutyl and cyclohexyl; and cycloalkenyl radicals such as cyclopentenyl and cyclohexadienyl.

Examples of monovalent haloaliphatic and cyanoalkyl radicals that can function in diorganopolysiloxane (2) include chloromethyl, 3,3,3-trifluoropropyl, 2-iodovinyl, 3,4-dibromocyclopentenyl, α-chloro-α,β,β-trifluorocyclobutyl, β-cyanoethyl, β-cyanopropyl and omega-cyanooctyl.

Diorganopolysiloxane (2) can be a copolymer in which the monovalent radicals thereon are alike. It can be a copolymer wherein there are two or more kinds of said monovalent hydrocarbons present. In addition, the said component can be a mixture of copolymers. Regardless, the viscosity of diorganopolysiloxane (2) can be from 50 to 10,000 cs. at 25° C., and in a preferred range from 100 to 1,000 cs. If the viscosity of component (2) is above 10,000 cs. there is a resulting bleed-out or oiliness on the surface of the treated leather. If the viscosity of the said component (2) is below 50 cs. there is a marked reduction in scuff resistance of the treated leather.

Methods of preparation of the triorganosilyl endblocked diorganosiloxanes are old and well known in the art. It is also well recognized that these materials may contain small amounts of monoorganosiloxane units and $SiO_2$ units, but that they are essentially diorganopolysiloxanes with triorganosilyl endblocking. It is further well known that these materials are mixtures of different molecular weights, and are best described by the viscosity of the fluid.

It is important that the ratios of components (1) and (2) be maintained between the stated limits. If the amount of component is less than 10 percent (and component (2) greater than 90 percent) there is marked reduction in both the water repellency and scuff resistance of the treated leather. If the concentration of (1) is greater than 75 percent the water repellency and scuff resistance are still good, but the treated leather is too brittle and will crack with flexing. When the concentrations of components (1) and (2) are within the stated limits, leather treated therewith has good water repellency, scuff resistance and easier finishability, without the above-mentioned difficulties encountered outside these stated limits. A preferred range is from 25 to 50 percent of component (1).

The composition of this invention can be applied to leather by the usual means, such as by dipping and roller coating. Spraying can be employed, if desired, but the rate of coating may be somewhat slow by this method. To facilitate application of the coating composition it is preferable, but not necessary, to dissolve the composition in an inert organic solvent. An especially suitable range of concentrations is from 5 to 25 percent by weight of the coating composition to from 75 to 95 percent by weight of solvent.

Suitable inert organic solvents are those containing no functional radicals that would react with an isocyanate radical and include, for instance, hydrocarbons such as hexane, heptane, cyclohexane, benzene, toluene, petroleum ethers and mineral spirits, the last two being examples of commercial hydrocarbon mixtures sold for solvent purposes; halogenated hydrocarbons such as methylene chloride and perchloroethylene; and ethers such as diethyl ether, dibutyl ether and methylamyl ether. It is of course necessary that the solvent contain no impurities that will react with an isocyanate radical.

The applied coating cures to a firm tack-free water repellent scuff resistant state by exposure to moisture. The coating is usually tack-free by the time the solvent, if used, has evaporated. While it is not necessary to do so, the treated leather article can be heated to hasten curing of the treatment coating. The normal moisture content of leather also serves to hasten the cure of the coating composition.

The amount of coating to be deposited on the leather depends on the nature of the leather and the degree of water repellency and scuff resistance desired. On most leathers there is a noticeable improvement in the above said properties with as little as one percent addition of cured coating based on the weight of leather. For maximum improvement of water repellency and scuff resistance it is desirable to add 15 to 25 percent by weight of cured coating composition based on the weight of leather to be treated. More than 25 percent can be applied, but there is no gain in the desired properties, and in addition the amount of treatment may become objectionable from a visual standpoint if too much is used. It is of course wasteful to use more material than necessary to obtain the effect desired.

Because the composition cures to a solid state on exposure to moisture, reasonable care must be exercised when using the materials. The use of solvents is desirable because the said solvents serve to reduce the susceptibility of the composition to curing. However, with reasonable care, a partially used solution for, say, dip-coating can be stored closed overnight and reemployed the next day without noticeable deterioration. In fact, the procedure of closed storage and reuse can be repeated several times without difficulty.

The water repellency of the treated leather is measured in a leather testing machine. This machine is similar in operation to the machine pictured and described on pages 401–2 of the August, 1957 issue of the "Journal of the American Leather Chemists Association." The machine used has a specimen holder composed of two vertical clamps. Each clamp has one fixed and one movable arm. One of the clamps is mounted on a horizontal reciprocating shaft, which is driven by an eccentric so that the shaft moves toward and away from the fixed shaft. The leather sample is folded and a gasket placed in each end so as to form a trough. Lead shot is placed in the trough of the sample, each end of the sample is placed between the two arms of a clamp, and the clamp tightened. The trough portion of the sample is suspended in water and the reciprocating shaft run at 60 flexes per minute. The sample is flexed by the reciprocating shaft. The number of cycles for the leather to wet through is determined by an electric counter. This is accomplished by having an electrode inside the sample and one outside the sample. The water penetration is detected by a current leakage from the inside electrode through the leather sample to the outside electrode. A salt is added to the water so that it will conduct electric current. The electric counter is electrically stopped when the water initially penetrates the sample and thus completes an electric circuit between the two electrodes. The number of cycles required for this to occur is the measure of water repellency.

The scuff-resistance of the treated leather was measured on a modified crock meter. The particular instrument used was a crock meter as described in Technical Manual of American Association of Textile Chemists and Colorists, pages 75–6 (1956 Edition), modified by the addition of a diamond needle held by a clamp attached at the business end of the machine near the foot normally used to measure crocking, in such a way that the diamond needle projects below the said foot and rides on the surface of the test piece. The arm of this machine is of a standard weight, being several pounds. The added weight of the diamond needle and its clamp is 28.65 grams.

In its operation the machine drives the diamond needle across the surface of the test piece in a reciprocating motion so that one stroke is forward and the next in the reverse direction. One cycle therefore constitutes two strokes of the machine. The number of cycles required to wear through the leather coating and make a visible mark on the leather is determined, and is a measure of scuff resistance. The greater the number of cycles to visible marking of the leather, the more scuff resistant is the coating. Normally, observation is not made for less than five cycles, and thereafter only at 5 cycle intervals.

None of the prior known water repellent leather treating compositions produce a coating with a scuff resistance of 5. All suffer penetration to the leather in less than 5 strokes. Employing the composition of this invention, there is obtained a scuff resistance of from 10 to 25 depending on the type of leather and degree of treatment. As herein earlier stated, the said scuff resistance is obtained in addition to and conjunction with good water repellency.

The following examples are illustrative only and are not intended to limit the invention which is properly delineated in the appended claims. In the examples the symbol Me is used to represent the methyl radical.

EXAMPLE 1

This example illustrates one method of preparing a polysiloxane isocyanate.

A reactor was charged with 100 pounds of octamethylcyclotetrasiloxane, 2.71 pounds of tetramethyldihydrogendisiloxane, 1.44 pounds of a hydroxyl endblocked methylhydrogenpolysiloxane fluid and 1.04 pounds of 15 percent fuming sulfuric acid. The mixture was stirred 24 hours at room temperature, after which 6.25 pounds of sodium bicarbonate was added to neutralize the sulphuric acid. The mixture was heated to 90° C. with stirring to hasten the said neutralization. After cooling, the product was filtered, then stripped of volatiles by heating to 170° C. at 1 to 2 millimeters of mercury. There was obtained 92 pounds of a fluid polysiloxane of the structure

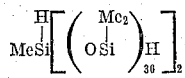

A mixture of 7.83 pounds of allyloxypropanol in 17.7 pounds of toluene were heated in a reactor to the reflux of the mixture. A catalyst (3.76 grams of $H_2PtCl_6$ dissolved in a minimum of dimethylphthalate) was then added, after which 92 pounds of the polysiloxane fluid supra were added slowly with stirring. The reacting mixture was then refluxed 24 hours, and thereafter stripped of volatile material (toluene and excess allyloxypropanol) by heating to 135° C. at 1 to 2 millimeters of mercury. A yield of 80 pounds of modified polysiloxane fluid was obtained, of the structure

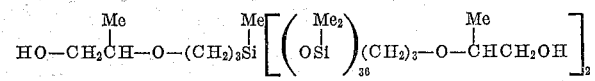

A reactor was flushed with dry nitrogen to remove moisture. The 80-pound quantity of the above fluid was placed in the reactor and 5.18 pounds of toluene diisocyanate added thereto. The mixture was stirred three hours at 75° C., then cooled and transferred to storage containers that had been flushed with dry nitrogen. A total of 83 pounds was obtained of a polysiloxane isocyanate of the structure

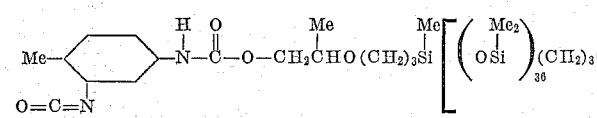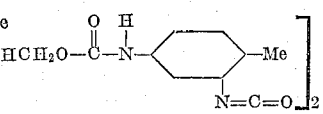

EXAMPLE 2

A treating solution was prepared of the following composition:

25 grams of the polysiloxane isocyanate of Example 1
50 grams of a trimethylsilyl endblocked dimethylpolysiloxane having a viscosity of 350 cs. at 25° C.
225 grams of a hydrocarbon solvent consisting of aliphatic hydrocarbons and having a boiling range of 157° to 197° C. and a flash point of 105° F.

Four samples (1, 2, 3 and 4) of Seco leather were treated by immersion in the above solution for 2 minutes, followed by draining and air drying 48 hours at room temperature. The weight gain was determined and is shown as solids pickup, expressed in percent of original leather weight, in the table below. Water repellency and scuff resistance were determined and are shown in the table. Typical properties of untreated leather (5), leather treated for water repellency only (6) and leather treated for scuff resistance only (7) are shown for comparison.

Table 1

| Sample | Solids Pickup | (Water repellency) Flexes to failure | (Scuff resistance) Cycles to Mark Leather |
|---|---|---|---|
| 1 | 15.7 | 100,000+ | 15 |
| 2 | 20.2 | 63,042 | 15 |
| 3 | 15.3 | 30,503 | 15 |
| 4 | 18.2 | 10,625 | 15 |
| 5 | | 50 to 100 | ≤1 |
| 6 | 15 to 20 | 10,000 to 100,000+ | ≤1 |
| 7 | 3 to 6 | 50 to 100 | 10 to 20 |

EXAMPLE 3

The following treating solution was prepared:
15 grams of the polysiloxane isocyanate of Example 1
30 grams of a trimethylsilyl endblocked dimethylpolysiloxane fluid having a viscosity of 50 cs. at 25° C.
255 grams of perchloroethylene.

Four samples of Seco leather were immersed two minutes in the treating solution, drained, and air-dried 48 hours at room temperature. Solids pickup, flexes to failure and cycles to mark were determined and found to be as follows:

| Sample | 1 | 2 | 3 | 4 |
|---|---|---|---|---|
| Solids pickup (percent) | 19.0 | 19.9 | 19.0 | 20.3 |
| Flexes to failure | 8,300 | 6,684 | 48,229 | 11,918 |
| Cycles to mark | 15 | 15 | 25 | 15 |

Similar results are obtained when dibutyl ether is substituted for perchloroethylene in the treating solution.

EXAMPLE 4

In this example the treating solution was the same as that of Example 3 except that the trimethylsilyl endblocked dimethylpolysiloxane had a viscosity of 1,000 cs. at 25° C. Four samples of Seco leather were dipped into this solution for 2 minutes, drained, air-dried 48 hours at room temperature and tested. The following results were obtained:

| Sample | 1 | 2 | 3 | 4 |
|---|---|---|---|---|
| Solids pickup (percent) | 23.5 | 21.6 | 21.3 | 22.6 |
| Flexes to failure | 5,809 | 11,281 | 14,004 | 7,201 |
| Cycles to mark | 15 | 25 | 25 | 25 |

EXAMPLE 5

Equivalent results are obtained when any of the polysiloxane isocyanates of the structures shown below are substituted for the polysiloxane isocyanate of Example 2:

(a)

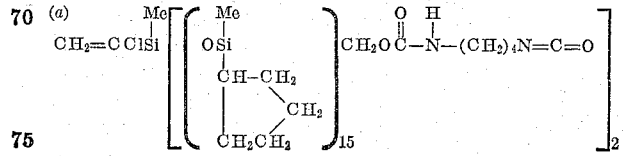

(b)
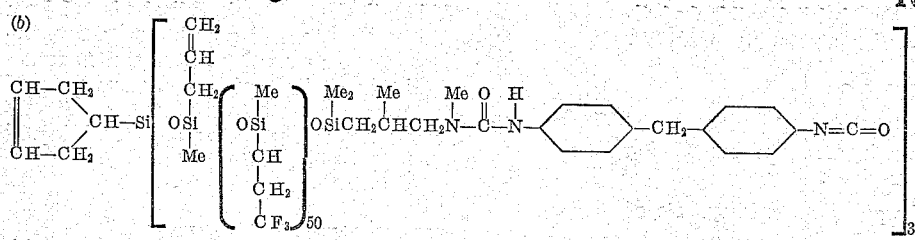

(c)
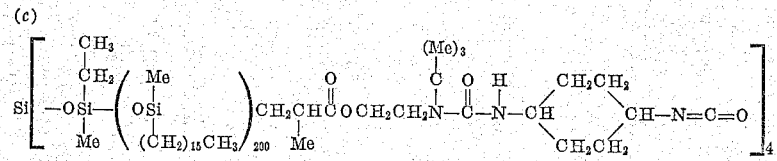

(d)
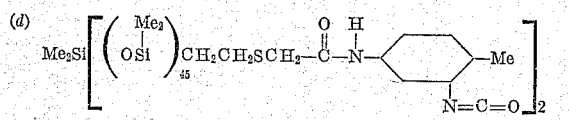

propylmethylpolysiloxane fluid having a viscosity of 8,500 cs. at 25° C. and 80 percent by weight of a 3,4-dibromocyclohexylethylmethylsilyl endblocked copolymer fluid containing 2 mol percent of 1-chloroallylmethylsiloxane units, 13 mol percent diethylsiloxane units, 4 mol percent (e)
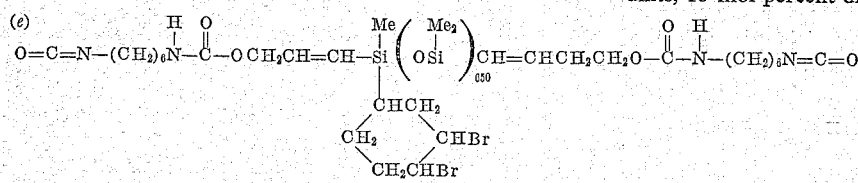

(f)
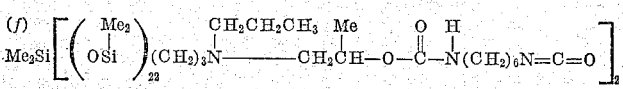

(g)
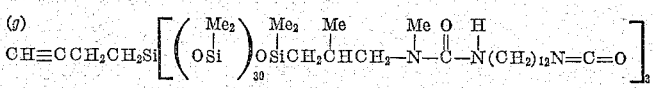

(h) A mixture of 20 percent by weight

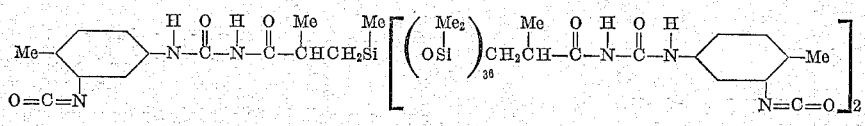

and 80 percent by weight

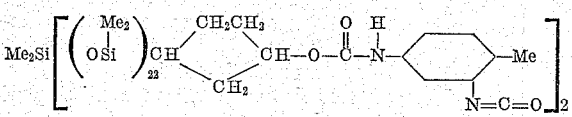

(i)
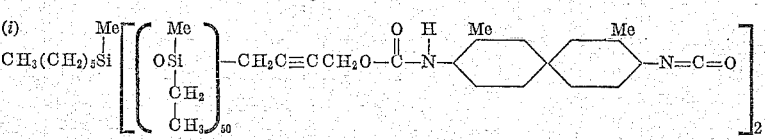

EXAMPLE 6

Similar results are obtained when the following triorganosilyl endblocked diorganopolysiloxanes are substituted for the trimethylsilyl endblocked dimethylpolysiloxane of Example 3.

(a) A vinyldimethylsilyl endblocked cyclohexylmethylpolysiloxane fluid having a viscosity of 750 cs. at 25° C.

(b) A copolymer fluid 2 mol percent in ethynylmethylsiloxane, 10 mol percent in octadecylmethylsiloxane and 88 mol percent in ethylmethylsiloxane, endblocked with cyclopentenyldimethylsilyl groups, having a viscosity at 25° C. of 385 cs.

(c) A mixture containing 20 percent by weight of a chloromethyldimethylsilyl endblocked 3,3,3 - trifluoro- of tertbutylmethylsiloxane units, 20 mol percent of 3-cyanopropylmethylsiloxane units and 61 mol percent of ethylmethylsiloxane units having a viscosity of 700 cs. at 25° C.

EXAMPLE 7

A water repellent scuff resistant coating on leather results when the following mixture is applied by rollercoating and allowed to cure on the leather by exposure to moisture:

(1) 25 parts by weight of a polysiloxane isocyanate of the structure

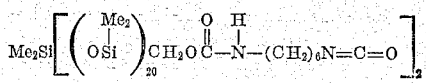

and (2) 75 parts by weight of a trimethylsilyl-endblocked dimethylpolysiloxane fluid having a viscosity of 50 cs. at 25° C.

EXAMPLE 8

Equivalent results are obtained when the treatment of leather according to Example 3 is performed, substituting one of the following treating solutions:

(a) 24 parts by weight of the polysiloxane isocyanate of of Example 1,
126 parts by weight of a trimethylsilyl-endblocked dimethylpolysiloxane fluid having a viscosity of 100 cs. at 25° C.,
850 parts by weight of perchloroethylene, (b) 90 parts by weight of the polysiloxane isocyanate of Example 1,
60 parts by weight of a trimethylsilyl-endblocked ethylmethylpolysiloxane fluid having a viscosity of 750 cs. at 25° C.,
850 parts by weight of perchloroethylene.

That which is claimed is:
1. A composition of matter consisting essentially of
(1) from 10 to 75 percent by weight of an organopolysiloxane isocyanate of the structure

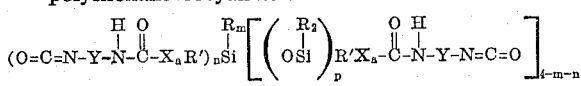

wherein
R is a monovalent radical selected from the group consisting of aliphatic and cycloaliphatic hydrocarbons and aliphatic and cycloaliphatic halohydrocarbons,
R' is a divalent aliphatic radical being selected from the group consisting of hydrocarbons, hydrocarbon monoethers, hydrocarbon monothioethers, hydrocarbon monoesters and hydrocarbon monotertiaryamines.
X is selected from the group consisting of —O—, —S—,

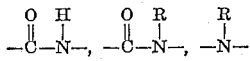

wherein R is as above defined,
Y is a divalent hydrocarbon radical free of aliphatic unsaturation having at least four carbon atoms therein,
a is an integer from 0 to 1 inclusive,
m is an integer from 0 to 2 inclusive,
n is an integer from 0 to 1 inclusive,
m+n is an integer from 0 to 3 inclusive,
p is a positive integer such that the sum of all p values in the molecule is from 30 to 700 inclusive, and
(2) from 25 to 90 percent by weight of a triorganosilyl endblocked diorganopolysiloxane having a viscosity of from 50 to 10,000 cs. at 25° C. wherein the organic radicals attached to silicon are selected from the group consisting of monovalent aliphatic and cycloaliphatic hydrocarbon radicals, monovalent aliphatic and cycloaliphatic halohydrocarbon radicals and monovalent cyanoalkyl radicals.

2. A composition of matter consisting essentially of
(A) a mixture of
(1) from 10 to 75 percent by weight of an organopolysiloxane isocyanate of the structure

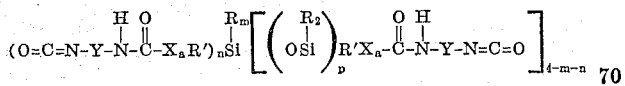

wherein
R is monovalent and selected from the group consisting of aliphatic and cycloaliphatic hydrocarbon radicals and aliphatic and cycloaliphatic halohydrocarbon radicals, R' is a divalent aliphatic radical selected from the group consisting of hydrocarbons, hydrocarbon monoethers, hydrocarbon monothioethers, hydrocarbon monoesters and hydrocarbon monotertiaryamines,
X is selected from the group consisting of —O—, —S—,

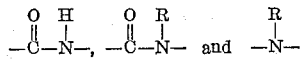

wherein R is as above defined,
Y is a divalent hydrocarbon radical free of aliphatic unsaturation having at least four carbon atoms therein,
a is an integer from 0 to 1 inclusive,
m is an integer from 0 to 2 inclusive,
n is an integer from 0 to 1 inclusive,
m+n is an integer from 0 to 3 inclusive,
p is a positive integer such that the sum of all p values in the molecule is from 30 to 700 inclusive, and
(2) from 25 to 90 percent by weight of a triorganosilyl endblocked diorganopolysiloxane having a viscosity of from 50 to 10,000 cs. at 25° C., wherein the organic radicals attached to silicon are selected from the group consisting of monovalent aliphatic and cycloaliphatic hydrocarbon radicals, monovalent aliphatic and cycloaliphatic halohydrocarbon radicals and cyanoalkyl radicals in
(B) an inert organic solvent.

3. A method of treating leather to render it simultaneously water repellent and scuff resistant consisting essentially of
(A) treating the said leather with a mixture
(1) from 10 to 75 percent by weight of a polysiloxane isocyanate of the structure

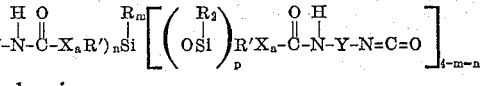

wherein
R is a monovalent radical selected from the group consisting of aliphatic and cycloaliphatic hydrocarbon radicals and aliphatic and cycloaliphatic halohydrocarbon radicals,
R' is a divalent aliphatic radical selected from the group consisting of hydrocarbons, hydrocarbon monoethers, hydrocarbon monothioethers, hydrocarbon monoesters and hydrocarbon monotertiaryamines,
X is selected from the group consisting of —O—, —S—,

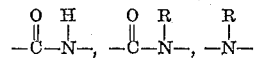

wherein R is as above defined,
Y is a divalent hydrocarbon radical free of aliphatic unsaturation having at least four carbon atoms therein,
a is an integer from 0 to 1 inclusive,
m is an integer from 0 to 2 inclusive,
n is an integer from 0 to 1 inclusive,
m+n is an integer from 0 to 3 inclusive,
p is a positive integer such that the sum of all p values in the molecule is from 30 to 700 inclusive, and
(2) from 25 to 90 percent by weight of a diorganopolysiloxane having a viscosity of from 50 to 10,000 cs. at 25° C. wherein the organic groups attached to the silicon are selected from the group consisting of monovalent aliphatic and cycloaliphatic hydrocarbon radicals, monovalent aliphatic and cycloaliphatic halohydrocarbon radicals, and monovalent cyanoalkyl radicals, and (B) curing the applied composition on the leather.

4. The water repellent and scuff resistant leather of claim 3.

5. The composition of matter consisting essentially of
(A) a mixture of
(1) from 25 to 50 percent by weight of a polysiloxane isocyanate of the structure

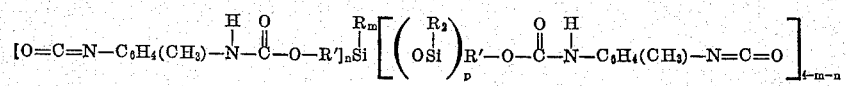

wherein
R is selected from the group consisting of methyl and 3,3,3-trifluoropropyl,
R' is selected from the group consisting of —CH$_2$CH$_2$CH$_2$— and

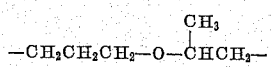

$m$ is from 1 to 2 inclusive,
$n$ is from 0 to 1 inclusive,
$m+n$ is from 1 to 3 inclusive,
$p$ is such that the sum of all $p$ values is from 100 to 250, and
(2) from 50 to 75 percent by weight of a trimethylsilyl endblocked diorganopolysiloxane having a viscosity of from 100 to 1,000 cs. at 25° C. wherein the organic radicals attached to silicon are selected from the group consisting of methyl radicals and 3,3,3-trifluoropropyl radicals in
(B) an inert organic solvent.

6. A method of rendering leather both water repellent and scuff resistant while at the same time having easy finishability which comprises (1) applying to the said leather the composition according to claim 5, and (2) curing it thereon.

7. The treated article of leather that is simultaneously water repellent and scuff resistant and capable of easy finishing obtained by (1) applying to the said leather the composition according to claim 5, and thereafter (2) curing the said composition to the said leather.

References Cited by the Examiner
UNITED STATES PATENTS
2,527,590  10/50  Speier _____ 260—46.5
2,728,736  12/55  Hunter et al. _____ 260—46.5

MURRAY TILLMAN, *Primary Examiner.*
LEON J. BERCOVITZ, *Examiner.*